United States Patent
Kim et al.

(10) Patent No.: US 8,506,892 B2
(45) Date of Patent: Aug. 13, 2013

(54) EXHAUST GAS PURIFYING DEVICE FOR DIESEL ENGINE

(75) Inventors: Yong-Woo Kim, Daejeon (KR);
Do-Woan Kim, Daejeon (KR);
Joon-Seok Min, Daejeon (KR);
Seong-Ho Lee, Daejeon (KR);
Hong-Seok Jung, Daejeon (KR);
Yun-Guen Cho, Daejeon (KR);
Hyo-Jun Jeon, Daejeon (KR); Nicholas Kim, Kyeonggi-do (KR); Gi-Ho Goh, Daejeon (KR); Sang Hoon Park, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 1107 days.

(21) Appl. No.: 12/084,208

(22) PCT Filed: Sep. 6, 2006

(86) PCT No.: PCT/KR2006/003536
§ 371 (c)(1),
(2), (4) Date: Apr. 28, 2008

(87) PCT Pub. No.: WO2007/049851
PCT Pub. Date: May 3, 2007

(65) Prior Publication Data
US 2009/0288400 A1    Nov. 26, 2009

(30) Foreign Application Priority Data

Oct. 28, 2005  (KR) .................. 10-2005-0102494
Jul. 6, 2006   (KR) .................. 10-2006-0063597

(51) Int. Cl.
*B01D 50/00*    (2006.01)

(52) U.S. Cl.
USPC .......................... 422/171; 422/177

(58) Field of Classification Search
USPC ....................... 422/168, 177, 180
See application file for complete search history.

(56) References Cited

U.S. PATENT DOCUMENTS

| 7,251,929 B2* | 8/2007 | Hu et al. .......... 60/285 |
| 2003/0115860 A1* | 6/2003 | May et al. ........ 60/302 |
| 2004/0033175 A1* | 2/2004 | Ohno et al. ...... 422/180 |
| 2004/0211172 A1 | 10/2004 | Wang et al. |
| 2005/0166576 A1* | 8/2005 | Funabashi ........ 60/278 |

FOREIGN PATENT DOCUMENTS

| JP | 2736099 | 1/1998 |
| JP | 2001-193440 | 7/2001 |
| JP | 2002-021544 | 1/2002 |
| KR | 10-2004-0077683 | 9/2004 |
| KR | 10-2005-0100000 | 10/2005 |

* cited by examiner

*Primary Examiner* — Tom Duong
(74) *Attorney, Agent, or Firm* — Clark & Brody

(57) ABSTRACT

The present invention relates to an exhaust gas purifying device for a diesel engine, which purifies efficiently Nitrogen Oxides (NOx) and Particulate Matters (PM) contained in exhaust gases of the diesel engine, particularly provides an exhaust gas purifying device disposed in an exhaust passage of a diesel engine, wherein a catalyst part for reducing Nitrogen Oxides and a filter part for removing Particulate Matter are provided sequentially from an upstream for a flow of the exhaust gas and a diesel fuel injector is mounted at a front of the Nitrogen Oxide reduction catalyst part.

9 Claims, 1 Drawing Sheet

EXHAUST GAS PURIFYING DEVICE FOR DIESEL ENGINE

TECHNICAL FIELD

The present invention relates to an exhaust gas purifying device for a diesel engine, which purifies efficiently Nitrogen Oxides (NOx) and Particulate Matters (PM) contained in exhaust gases of the diesel engine.

BACKGROUND ART

Demands for diesel engines have continuously raised as the diesel engines are variously used in entire industries such as an automobile, shipbuilding, general industry and etc., and are possible of operation in high power and high load on the basis of high fuel efficiency and high reliability. In addition, as an employment of a diesel engine becomes obvious in a 3 L car program or super car project promoted for the purpose of a high fuel efficiency of an automobile, they are expected to increase automobiles with a diesel engine. However, the diesel automobiles are responsible for 40 percent of total air pollution, thus may be recognized as a principal offender of air pollution in developed countries.

To deal with the above, each country has reinforced a regulation of exhaust gases of the diesel automobiles. Such air pollution due to the diesel automobile is mainly generated by Nitrogen Oxides (NOx) and Particulate Matters (PM). Thus, main objective materials of the regulation of the exhaust gases of the diesel automobiles are the Nitrogen Oxides and the particulate matters, technologies for dealing with them are concentrated in decrease of a concentration of the Nitrogen Oxides by delaying of fuel injection timing and Exhaust Gas Recirculation (EGR) and decrease of the particulate matters by improvement and reformation of combustion performance of the engine.

As a method for reducing the Nitrogen Oxides, it is used a Selective Catalytic Reduction (SCR) which reduces Nitrogen Oxides to nitrogen and oxygen using a reducing agent on a catalyst.

Ammonia, urea and hydrocarbon may be used as the reducing agent, but the hydrocarbon is preferred because the ammonia and the urea have a disadvantage of requiring an additional supply infra, and types of the hydrocarbon are diesel, kerosene, propylene, propane, ethylene, butylene, methane and etc.

Meanwhile, a Diesel Particulate Filter is widely used for removing the PM, and regeneration methods can be classified as a passive regeneration type and an active regeneration type. In the passive regeneration type the Diesel Particulate Filter is regenerated by converting NO to $NO_2$ over an oxidation catalyst on the DPF and produced $NO_2$ oxidize the PM, and in the active regeneration type it is used an auxiliary device forcibly increasable a temperature of the filter for more active regeneration. In the active regeneration type may be an increase of the temperature of filter by using an electric heater, a usage of a plasma reactor provided in front of the DPF, an injection and burning of diesel fuel and etc.

As a conventional exhaust gas purifying device for a diesel engine is known an exhaust gas purifying device, wherein DPF on which the oxidation catalyst is supported is disposed at upstream of an exhaust passage, a hydrocarbon selective reduction type Nitrogen Oxide reduction catalyst (DeNOx catalyst) is arranged at downstream of an exhaust passage and a fuel injector is mounted between the DPF and the DeNOx catalyst.

However, the conventional exhaust gas purifying device is hardly successful in removing efficiently together the Nitrogen Oxides and CO and total hydrocarbon (THC) including the Particulate Matters in a middle temperature range.

DISCLOSURE

Technical Problem

Therefore, an object of the present invention is to provide an exhaust gas purifying device for a diesel engine wherein performance of reducing Nitrogen Oxides and efficiency of removing Particulate Matters is more improved in 250~600° C. which is real temperature of an automobile exhaust gases while it is possible to remove CO, THC and etc.

Further, another object of the present invention is to provide an exhaust gas purifying device for a diesel engine wherein a Nitrogen Oxide reduction catalyst and a diesel particulate filter are serially connected and a diesel fuel injector is mounted at a front of the Nitrogen Oxide reduction catalyst, whereby a reduction of Nitrogen Oxides is implemented by diesel fuel injection while the diesel particulate filter is regenerated.

Technical Solution

The present invention relates to an exhaust gas purifying device for a diesel engine, which purifies efficiently Nitrogen Oxides (NOx) and Particulate Matters (PM) contained in exhaust gases of the diesel engine, particularly provides an exhaust gas purifying device disposed in an exhaust passage of a diesel engine, wherein a nitrogen oxide reduction catalyst part for reducing Nitrogen Oxides and a diesel particulate filter part for removing Particulate Matter are provided sequentially from an upstream for a flow of the exhaust gas and a diesel fuel injector is mounted at a front of the Nitrogen Oxide reduction catalyst part.

The present invention will be described in detail hereinafter.

An exhaust gas purifying device for a diesel engine according to the present invention reduces NOx over a Nitrogen Oxide reduction catalyst part (referred as 'DeNOx catalyst part' hereinafter) by injecting diesel fuel and removes Particulate Matters accumulated at a Diesel Particulate Filter (referred as 'DPF' hereinafter) part by diesel combustion, while removes CO and THC In the present invention, Nitrogen Oxides may be more efficiently removed as the Nitrogen Oxides is removed by the DPF catalyst additionally in middle temperature ranged in 250~350° C. as well as by the DeNOx catalyst. In the conventional case of simply using the DeNOx catalyst, desired removal efficiency can not be achieved as a conversion rate is low in the middle temperature ranged in 250~350° C.

Further, in the present invention, as most of the Particulate Matters are removed in DPF part, diesel fuel is uniformly spread while passing through the DeNOx catalyst in the case of injecting the diesel fuel at a front of the DeNOx catalyst, and thus regeneration of DPF could be easily achieved.

In addition, exhaust gas purifying device according to the present invention can remove more effectively carbon monoxide (CO) and total hydrocarbon (THC) removed in the conventional exhaust gas purifying device.

As the CO cannot be removed in the DeNOx catalyst, the CO is rather to be increased in the case that the DeNOx catalyst alone is provided. However, the CO can be removed efficiently over 200° C. due to the platinum group elements of the DPF catalyst in accordance with the present invention.

In the case of the THC, it also cannot be removed in the DeNOx catalyst. Particularly, in the case of injecting diesel fuel as a reducing agent for removing the Nitrogen Oxides, much more hydrocarbon (HC) becomes to be contained in the exhaust gas compare to the case of not. For solving such problem, unreacted HC increased while passing through the DeNOx catalyst can be removed efficiently in the DPF catalyst As an embodiment of the present invention, an exhaust gas purifying device is illustrated in FIG. 1. According to FIG. 1, DeNOx catalyst part 1 is provided upstream along flow of the exhaust gas, DPF part 2 is provided serially thereto, and a diesel fuel injector 3 is mounted at a front of the DeNOx catalyst part 1.

As another embodiment of the present invention, an exhaust gas purifying device is illustrated in FIG. 2. According to FIG. 2, a plurality of DeNOx catalyst parts are adjacently and continuously arranged in multi-layer. In the case of adjacently arranging the DeNOx catalyst parts, there is advantages that a surface through which the exhaust gas passes is increased thereby capable of enhancing a NOx reduction efficiency, further the NOx reduction efficiency is superior in various temperature range and a NOx reduction performance is also superior regardless of an operation state of an engine which induces differences in the NOx reduction performance in accordance with a temperature of the exhaust gas as the NOx reduction efficiency can be increased by using different catalysts in each layer or varying a content of the catalyst. The DeNOx catalyst part uses a catalyst carrying an silver (Ag) component, a copper (Cu) component or a mixture thereof; a possible material for carrying the silver (Ag) component is selected from the group consisting of silver metal (Ag), silver oxide ($Ag_2O$), silver chloride (AgCl), silver nitrate ($AgNO_3$), silver sulfate ($Ag_2SO_4$) or mixtures thereof, and a possible material for carrying the copper (Cu) component is selected from the group consisting of copper metal (Cu), copper oxide, copper acetate, copper nitrate, copper sulfate or mixtures thereof. As a carrier for carrying the catalyst, it is possible to use alumina ($Al_2O_3$), silica ($SiO_2$), titania ($TiO_2$), ceria ($CeO_2$), zirconia ($ZrO_2$) or zeolite, and also possible to use a mixture of more than 2 thereof. Among others, the NOx reduction performance was more superior in the case of using the alumina as a carrier.

The carrier used by being coated on a support body, and the amount thereof is preferably 0.5 to 4 $g/in^3$ on a basis of total amount of the catalyst. The performance of the catalyst is significantly dropped as the amount of the catalyst carried therein is absolutely insufficient in the case that the amount thereof is less than 0.5 $g/in^3$, on the contrary the performance of the catalyst is not increased any more and the production is not facilitated in the case that the amount thereof exceeds 4 $g/in^3$.

The support body of the DeNOx catalyst part is a flow-through type support body which is made of a heat-resisting ceramic or a metal, and a particular example thereof may be a cordierite honeycomb structural body.

It is preferable to use the silver component, the copper component or the mixture thereof in 0.1 to 10 weight percent on the basis of the carrier weight. The performance of the catalyst is significantly dropped as the amount of the component which acts as a catalyst is absolutely insufficient in the case that the content of the component is less than 0.1 weight percent, on the contrary the performance of the catalyst is also significantly dropped as the component exists in state of metal which is disadvantageous for reaction in the case that the content exceeds 10 weight percent.

Further, the DeNOx catalyst according to the present invention further carries platinum group component so that Nitrogen Oxide reduction performance is more superior in 250 to 600° C. which is real temperature of the exhaust gas. The Nitrogen Oxide reduction catalyst according to the present invention has a characteristic that the Nitrogen Oxide reduction performance is superior in 250 to 600° C. which is real temperature of the exhaust gas and the performance is more superior in 350 to 450° C. in the case of further carrying the platinum group component.

A metal useful as the platinum group noble metal carried in the DeNOx catalyst part may be one of Pt, Pd, Ru, Ir and Rh or mixture of at least two thereof, as a starting material for the palladium (Pd) may be used palladium nitrate, palladium chloride, tetraamine palladium dichloride and etc. Further, as a starting material for the platinum (Pt) may be used chloroplatinic acid, diamine nitritoplatinum, diamine chloroplatinum and etc., and as a starting material for the rhodium (Rh) may be used rhodium chloride, rhodium nitrate, triamine rhodium hexachloride and etc. In addition, content of the platinum group metal is 0.0001 to 0.5 weight percent, preferably 0.0005 to 0.2 weight percent, more preferably 0.001 to 0.1 weight percent. Because it is not helpful to improve the performance if the content is less than 0.0001 weight percent and the performance is rapidly dropped if the content exceeds 0.5 weight percent.

The DPF according to the present invention is a filter carrying platinum group catalyst, the element carried in the platinum group catalyst is at least one selected from the group consisting of Pt, Pd, Ir, and Rh, preferably Pt or Pd. A content of the platinum group catalyst carried in the DPF is 0.01 to 5 weight percent for the support body coated with the carrier; an effect of removing particulate matters is not appeared in the case of less than 0.01 weight percent and there may be an economical disadvantage as the performance is not improved any more in the case of exceeding 5 weight percent.

Further, the DPF may carry an oxidation cocatalyst component in addition to the platinum group catalyst. The oxidation cocatalyst component may act to inhibit an oxidation of sulfurous acid gas or to increase a surface activity of the platinum group catalyst. Generally, the platinum group catalyst shows high activity in oxidation reaction of a soluble organic fraction (SOF), but leads to a disadvantageous result that Particulate Matters are adversely increased as sulfurous acid gas ($SO_2$) which is a combustion product of sulfur contained in diesel fuel is oxidized to a sulphate. To solve such problem, it is possible to use at least one catalyst component selected from V, W or Mo in addition to the platinum group catalyst. The at least one catalyst component selected from V, W or Mo is preferably present in a content of 0.01 to 2 weight percent for the support body coated with the carrier. An effect of inhibiting the oxidation of sulfurous acid gas is not appeared in the case that the content is less than 0.01 weight percent, and the addition is insignificant and thus not economical in the case that the content exceeds 2 weight percent. Further, an alkali metal component such as K, Mg and etc. has low temperature mobility and thus acts to increase a surface activity of the platinum group catalyst, whereby contact between the catalyst and the particulate matter is facilitated and thus catalytic activity is enhanced. The alkali metal is preferably used in a content of 0.01 to 1 weight percent for the support body coated with the carrier. An effect of increasing the reaction activity of the platinum group catalyst is not appeared in the case that the content is less than 0.01 weight percent and the effect of addition is insignificant, and thus not economical in the case that the content exceeds 1 weight percent.

Further, As a carrier for carrying the catalyst, it is possible to use alumina ($Al_2O_3$), silica ($SiO_2$), titania ($TiO_2$), ceria ($CeO_2$), zirconia ($ZrO_2$) or zeolite, and also possible to use mixture of at least 2 thereof.

The DPF according to the present invention removes accumulated Particulate Matters by using a temperature increasing of the exhaust gas while oxidization of diesel fuel injected from the front of the Nitrogen Oxide reduction catalyst. It is preferable to use alloy material including cordierite, ceramic with SiC, Ni alloy or FeCr alloy which have higher heat resistance as the support body so as to use safely even in the case of excessive increasing of the temperature. In the case of using the high heat-resisting material as the support body, there is an advantage that it is possible to operate safely for high heat generated while DPF regeneration and to save an amount of diesel fuel to be injected by using heat generated while oxidization of excessive Particulate Matters.

DESCRIPTION OF DRAWINGS

The above and other objects, features and advantages of the present invention will become apparent from the following description of preferred embodiments given in conjunction with the accompanying drawings, in which.

Figure 1:
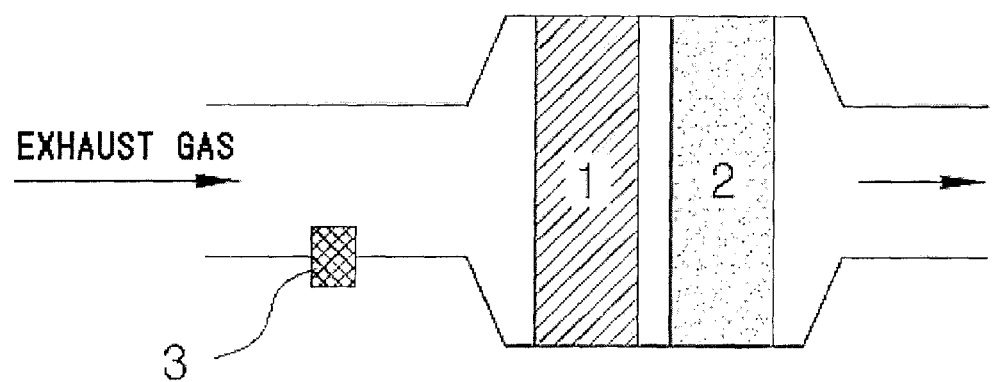
FIG. 1 shows an exhaust gas purifying device according to the present invention in the case that a DeNOx catalyst layer is one layer.
Figure 2:
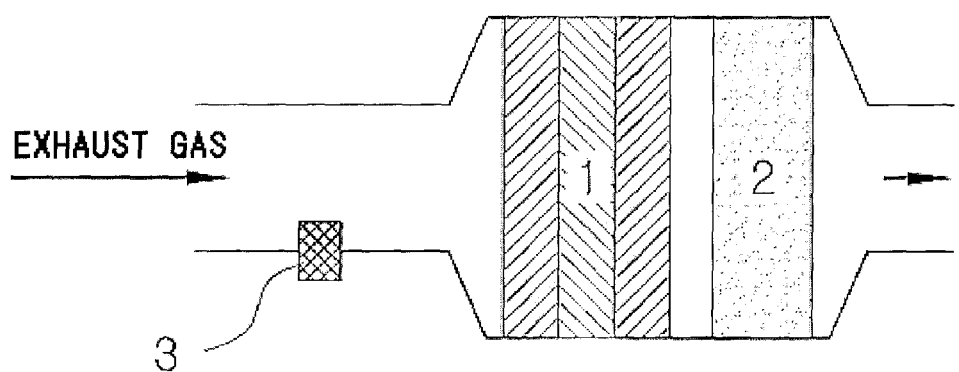
FIG. 2 shows an exhaust gas purifying device according to the present invention in the case that the DeNOx catalyst layer is multi-layer.

EXPLANATION OF REFERENCE NUMERALS FOR DESIGNATING MAIN COMPONENTS IN THE DRAWINGS

1: Nitrogen oxide reduction ($DeNO_x$) catalyst part
2: Diesel particulate filter (DPF) part
3: Diesel fuel injector

Best Mode

Hereinafter, the embodiments of the present invention will be described in detail with reference to accompanying drawings. However, it will be understood that the invention is not limited to those embodiments. On the contrary, the invention includes all alternatives, modifications, and equivalents as may be included within the spirit and scope of the appended claims.

Production Example 1

A Nitrogen Oxide reduction catalyst is manufactured as follows. Gamma alumina powder [surface area: 210 $m^2$/gr, pore volume: 0.5 cc/gr, specific gravity: 0.8 g/cc] was mixed with acetic acid and distilled water, then the mixture was milled for 24 hours using a wet ball mill, and thus uniform alumina slurry was made. A mean particle size of the alumina milled by the wet ball mill was intended to be 2 to 8 micrometer. Above made alumina slurry was washcoated with cordierite honeycomb which is 11.25 inches in diameter, 3 inches in length and 400 cspi in cell density so that the carrying amount of alumina became 3 g/$in^3$, followed by increasing temperature by 3° C. per minute from normal temperature to 120° C. in a furnace, followed by drying for 3 hours at 120° C., followed by increasing temperature by 3° C. per minute from 120° C. to 550° C., followed by calcining for 3 hours.

Then, after impregnating a dried body of the calcined alumina carrying cordierite with a solution made by dissolving chloroplatinic acid as a platinum precursor and silver nitrate so that an amount of silver is 2.0 weight percent and an amount of platinum catalyst component is 0.001 weight percent each for weight of alumina, the dried body was calcined at 120° C. for 3 hours and then at 550° C. for 3 hours in the same condition of the alumina washcoat.

Production Example 2

The diesel particulate filter was manufactured as follows. 252 g of poly vinyl pyrrolidone (Aldrich chemical co. inc., average molecular weight 10,000) were dissolved in distilled water within a flask of 2 L to make uniform solution. 30.4 g of chloroplatinic acid and 1 L of methanol were put therein and then were agitated. This solution was refluxed at 80° C. for 6 hours and then a dark-brown platinum colloid solution with 0.62 weight percent of platinum was obtained. 15.4 g of ammonium molybdate and 10 g of potassium hydroxide were put into 250 mL of distilled water respectively and agitated whereby molybdenum (Mo) aqueous solution and potassium aqueous solution were manufactured.

The manufactured platinum colloid solution, molybdenum (Mo) aqueous solution and potassium aqueous solution were mixed by a same weight ratio, and thus obtained a metal salt colloid solution for a catalyzed filter. As a support body of the catalyzed filter was used a wallflow shaped ceramic filter from Coning co. which is 11.25 inches in diameter, 14 inches in length and 200 cspi in cell density.

The honeycomb monolith was dried and calcined after depositing with 7 weight percent of titania and silica mixed washcoat solution. The colloid mixture for the catalyzed filter was carried into the washcoated support body, and a content of them was intended to be 0.27 weight percent for the platinum, 0.16 weight percent for the molybdenum and 0.077 weight percent for the potassium respectively on the basis of the support body coated with the carrier. Then, the diesel particulate filter was manufactured by calcining at 550° C. for 4 to 6 hours after drying at 120° C. for 3 hours.

Embodiment 1

Performance Evaluation of the Exhaust Gas Purifying Device—1

The Nitrogen Oxide reduction catalyst manufactured in the production example 1 and the diesel particulate filter manufactured in the production example 2 are connected continuously and then located in a canister made of stainless steel.

For evaluation test was used a Daewoo engine a displacement thereof being 11 L and applied with a turbocharger and an intercooler. The test for evaluating a Nitrogen Oxides and a Particulate Matter removal was carried out according to Japanese D-13 mode which is designed for a heavy duty diesel engine. The test was carried out at selected steady-state engine operating conditions, defined by constant engine rpm and load(torque) at engine dynamo. The Diesel fuel used in the test was ultra low sulfur diesel, the content of the sulfur therein being 50 ppm. The result showed reduction rates of 92% for carbon monoxide, 34% for hydrocarbon, 38% for Nitrogen Oxides and 93% for Particulate Matters.

TABLE 1

Test result of Nitrogen Oxides reduction and
Particulate Matter removal for Daewoo engine

|  | CO | HC | NOx | PM |
|---|---|---|---|---|
| Base, g/KWh | 0.880 | 0.262 | 8.137 | 0.214 |
| After mounting device, g/KWh | 0.066 | 0.172 | 5.036 | 0.014 |
| Reduction rate | 92.5% | 34.3% | 38.1% | 93.4% |

Embodiment 2

Performance Evaluation of the Exhaust Gas Purifying Device—2

It is used the same exhaust gas purifying device used in the embodiment 1.

An automobile used for evaluation test was that of Japan HINO Company, a displacement thereof being 12.9 L with a turbocharger and an intercooler. The test was carried in chassis DYNAMO.

The test for evaluating a Nitrogen Oxides reduction and a Particulate Matter removal was carried out by the Japanese D-13 mode for a heavy duty diesel engine. The diesel fuel used in the test was ultra low sulfur diesel, the content of the sulfur therein being 10 ppm. The result showed reduction rates of over 98% for carbon monoxide, 36% for hydrocarbon, 39% for Nitrogen Oxides and 97% for Particulate Matters.

TABLE 2

Test result of Nitrogen Oxides reduction and Particulate
Matter removal for an automobile of Japan HINO Company

|  | CO | HC | NOx | PM |
|---|---|---|---|---|
| Base, g/KWh | 2.338 | 0.502 | 5.426 | 0.557 |
| After mounting device, g/KWh | 0.045 | 0.319 | 3.227 | 0.016 |
| Reduction rate | 98.1% | 36.5% | 39.6% | 97.1% |

INDUSTRIAL APPLICABILITY

The exhaust gas purifying device according to the present invention is an exhaust gas purifying device in that the Nitrogen Oxides reduction performance is superior in 250 to 600° C. which is a real temperature of the exhaust gas and the removal efficiency of the Particulate Matters is also superior, and has an advantage that selective reduction of Nitrogen Oxides is implemented by diesel fuel injection and it is possible to regenerate the diesel Particulate filter at the same time. Further, a NOx reduction performance is also superior regardless of operation state of the engine and removal efficiency of CO and HC as well as PM is also superior.

The invention claimed is:

1. An exhaust gas purifying device disposed in an exhaust passage of a diesel engine, wherein a nitrogen oxide reduction ($DeNO_x$) catalyst part carrying a silver (Ag) component and a platinum (Pt) group catalyst component for reducing nitrogen oxides and a diesel particulate filter (DPF) part carrying a platinum (Pt) group catalyst component are provided sequentially from an upstream for a flow of the exhaust gas; a diesel fuel injector is mounted at a front of the nitrogen oxide reduction catalyst part; a pluralily of nitrogen oxide reduction catalyst parts are arranged adjacently in multi-layer; the nitrogen oxide reduction catalyst part has a support body made of heat-resisting ceramic or metal material and at least one carrier coated on the support body selected from alumina, silica, titania, ceria, zirconia or zeolite; and the nitrogen oxide reduction catalyst part carries 0.1 to 10 weight percent of silver (Ag) component and 0.0001 to 0.5 weight percent of platinum group catalyst component; and the diesel fuel injector is positioned upstream of the nitrogen oxide reduction ($DeNO_x$) catalyst part to be able to supply a reducing agent to the nitrogen oxide reduction ($DeNO_x$) catalyst part.

2. The exhaust gas purifying device according to claim 1, wherein the adjacent catalyst parts have different catalyst composition or content from one another.

3. The exhaust gas purifying device according to claim 1, wherein the diesel particulate filter has a support body made of heat-resisting ceramic or metal material and coated with at least one carrier selected from alumina, silica, titania, ceria, zirconia or zeolite.

4. The exhaust gas purifying device according to claim 3, wherein the diesel particulate filter carries 0.01 to 5 weight percent of platinum (Pt) component for the support body coated with the carrier.

5. The exhaust gas purifying device according to claim 4, wherein the diesel particulate filter further carries at least one of oxidation cocatalyst component selected from V, W, Mo, Mg or K.

6. The exhaust gas purifying device according to claim 5, wherein the oxidation cocatalyst component is in 0.01 to 2 weight percent for the support body coated with the carrier in a case that are selected from V, W or Mo and is in 001 to 1 weight percent for the support body coated with the carrier in a case that are selected from Mg or K.

7. The exhaust gas purifying device according to claim 1, wherein the nitrogen oxide reduction catalyst part carries 0.001 to 0.1 weight percent of platinum group catalyst component for the carrier.

8. The exhaust gas purifying device according to claim 7, wherein the platinum group catalyst component is at least one selected from the group consisting of Pt, Pd, Ir and Rh.

9. The exhaust gas purifying device according to claim 8, wherein the platinum group catalyst component is platinum (Pt).

* * * * *